(12) United States Patent
Shim et al.

(10) Patent No.: US 8,582,049 B2
(45) Date of Patent: Nov. 12, 2013

(54) FOLDABLE DISPLAY APPARATUS

(75) Inventors: Hong-shik Shim, Seoul (KR); In-seo Kee, Seongnam-si (KR); Sun-kook Kim, Hwaseong-si (KR); Hyuk-jun Kwon, Seoul (KR)

(73) Assignees: Samsung Electronics Co., Ltd. (KR); Samsung Display Co., Ltd. (KR)

( * ) Notice: Subject to any disclaimer, the term of this patent is extended or adjusted under 35 U.S.C. 154(b) by 39 days.

(21) Appl. No.: 13/309,996

(22) Filed: Dec. 2, 2011

(65) Prior Publication Data

US 2012/0147599 A1    Jun. 14, 2012

(30) Foreign Application Priority Data

Dec. 8, 2010    (KR) .................. 10-2010-0124865

(51) Int. Cl.
   *G02F 1/1333*    (2006.01)
   *G02F 1/133*    (2006.01)

(52) U.S. Cl.
   USPC ............................................. 349/58; 349/73

(58) Field of Classification Search
   USPC .................................................. 349/58, 73
   See application file for complete search history.

(56) References Cited

U.S. PATENT DOCUMENTS

| | | | | |
|---|---|---|---|---|
| 6,377,324 | B1* | 4/2002 | Katsura | 349/58 |
| 8,120,899 | B2* | 2/2012 | Kim | 361/679.28 |
| 8,209,894 | B2* | 7/2012 | Shim et al. | 40/541 |
| 8,228,461 | B2* | 7/2012 | Mizuuchi et al. | 349/62 |
| 8,330,900 | B2* | 12/2012 | Kuo et al. | 349/73 |
| 8,369,075 | B2* | 2/2013 | Huang | 361/679.21 |

FOREIGN PATENT DOCUMENTS

| KR | 10-2007-0109116 A | 11/2007 |
|---|---|---|
| KR | 10-2010-0092220 A | 8/2010 |

* cited by examiner

*Primary Examiner* — James Dudek
(74) *Attorney, Agent, or Firm* — Cantor Colburn LLP

(57) ABSTRACT

A foldable display apparatus includes a bendable display panel which folds with respect to a folding axis. The display panel includes a plurality of display devices and a window layer. Each of the display devices includes a plurality of pixels each including a plurality of color elements having different colors from each other. A plurality of color elements of a same color is linearly arranged in a direct line direction which is non-parallel to the folding axis. The window layer includes a soft material part including a soft material in a folding part of the display panel, and a protective window part other than the soft material part. The protective window part protects the display part of the plurality of display devices.

14 Claims, 6 Drawing Sheets

DIRECT LINE DIRECTION OF
COLOR ELEMENT ARRANGEMENT

FOLDABLE DISPLAY APPARATUS

CROSS-REFERENCE TO RELATED APPLICATIONS

This application claims priority to Korean Patent Application No. 10-2010-0124865, filed on Dec. 8, 2010, and all the benefits accruing therefrom under 35 U.S.C. §119, the disclosure of which is incorporated herein in its entirety by reference.

BACKGROUND

1. Field

Provided is a foldable display apparatus, and more particularly, a foldable display apparatus using a protective window structure including hard materials and soft materials for protection from external impact.

2. Description of the Related Art

In general, a display apparatus using a flat panel display panel, such as a liquid crystal display ("LCD"), a field emission display ("FED"), a plasma display panel ("PDP"), or an organic light-emitting diode ("OLED") display, is mainly applied to televisions ("TVs"), mobile phones, etc. Recently, as demand for a large screen in miniaturized portable devices, such as mobile phones and personal digital assistants ("PDAs"), increases, devices realizing a large screen through a connection with a flat panel display panel are available in the market. Furthermore, attempts for utilizing a display made of a flexible substrate are increasing.

A foldable display apparatus having a bending and folding feature that is a large advantage of a display made of a flexible substrate is easy to carry and can implement a large screen. The foldable display apparatus can be applied to not only mobile devices, such as mobile phones, portable multimedia players ("PMPs"), navigation systems, ultra mobile personal computers ("UMPCs"), e-books, and e-newspapers, but also to various fields, such as TVs and monitors.

In particular, since the foldable display apparatus has a relatively small structural volume required to make a large screen size, the foldable display apparatus will be widely used for portable devices. However, the foldable display apparatus used for portable devices needs a protective window structure for protecting a display part from external impact, and the protective window structure must also be foldable.

SUMMARY

Provided is a foldable display apparatus for improving a sense of rupture on a display screen by reflection of light at a joint part of hard materials and soft materials, when a window structure in which the joint part includes the soft materials and a remaining part includes the hard materials, is used.

Additional aspects will be set forth in part in the description which follows and, in part, will be apparent from the description, or may be learned by practice of the presented embodiments.

Provided is a foldable display apparatus including a bendable display panel which folds with respect to a folding axis. The display panel includes a plurality of display devices and a window layer. Each of the display devices includes a display part, and a plurality of pixels each including a plurality of color elements having different colors from each other. A plurality of color elements of a same color is linearly arranged in a direct line which is non-parallel to the folding axis. The window layer includes a soft material part including soft materials in a folding part of the display panel, and a protective window part other than the soft material part, where the protective window part protects the display part of the plurality of display devices.

The plurality of display devices may include color elements in a stripe arrangement structure in which the color elements of each color are in consecutive arrangement in the direct line direction, respectively.

The plurality of display devices may include the color elements of one color in consecutive arrangement in the direct line direction, and color elements of remaining colors in a lattice arrangement.

The protective window part may include a hard material.

The soft material part and the protective window part may include a transparent material.

The plurality of display devices may include a first display device and a second display device arranged with a height difference from the first display device so that an image is continuous at a joint between the first display device and the second display device when the foldable display apparatus is in an unfolded state.

The soft material part may be further between a display device among the first and second display devices which is furthest from the window layer, and a portion of the protective window part on the display device.

Each of the plurality of display devices may have a structure in which the direct line direction crosses the folding axis.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
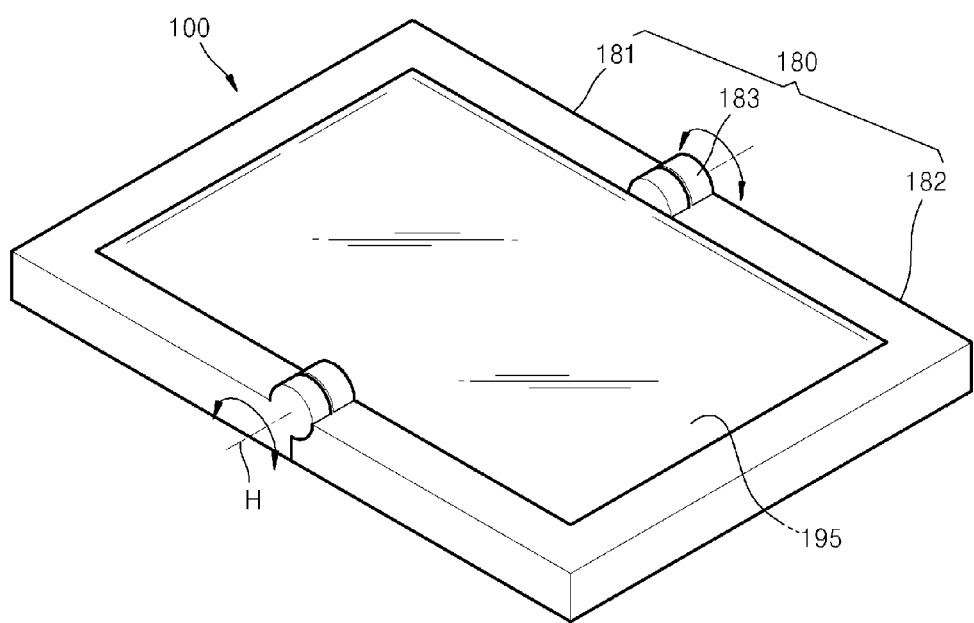
FIG. 1 is a schematic diagram of a foldable display apparatus according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. In the drawings, the thicknesses, widths, and intervals of layers and regions are exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

In a folding display apparatus, a protective window structure must not only protect a display part from external impact, but must also be foldable. Thus, a window structure may include a folding part, and a non-folding remaining part excluding the folding part. The folding part of the window structure may include soft materials and the remaining part may include hard materials. When the window structure includes both soft and hard (e.g., non-bendable) materials, a sense of image disconnection on a display screen which may be caused by reflection of light at a joint part of the hard materials and the soft materials, is reduced or effectively prevented.

Figure 2:
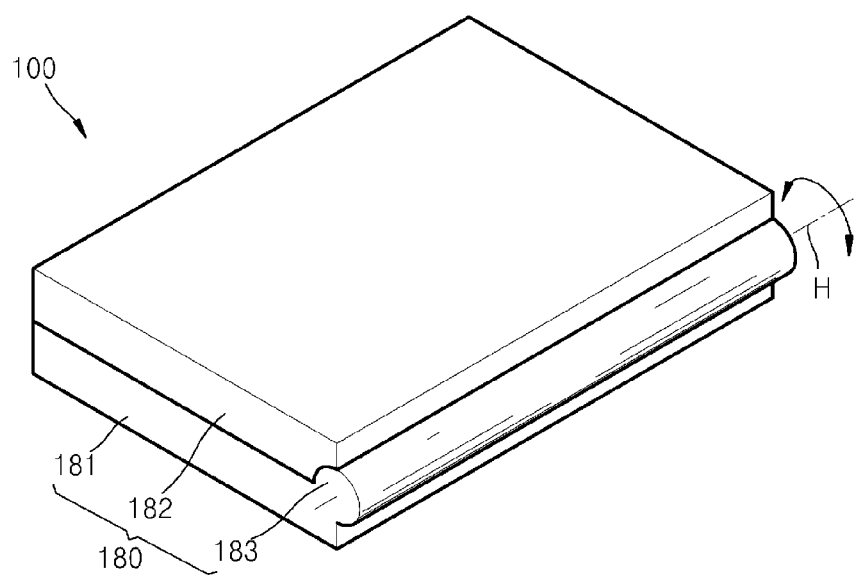
FIG. 2 is a schematic diagram of the foldable display apparatus of FIG. 1 in a folded state.
Figure 3:
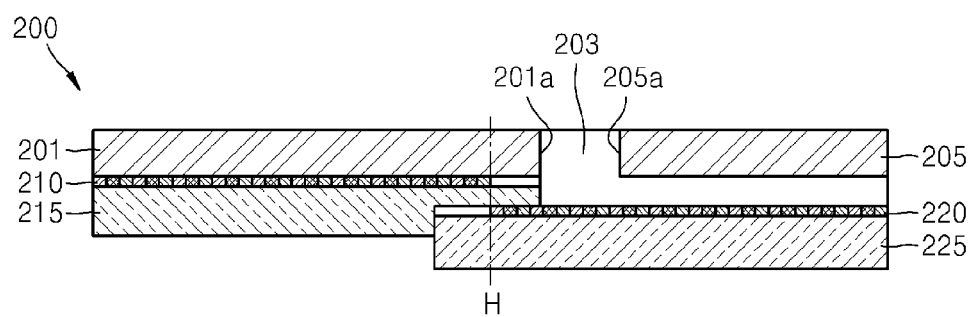
FIG. 3 is a cross-sectional view of a foldable display apparatus according to an embodiment of the present invention.

FIG. 1 is a schematic diagram of a foldable display apparatus 100 according to an embodiment of the present invention, and FIG. 2 is a schematic diagram of the foldable display apparatus 100 of FIG. 1 in a folded state. FIG. 3 is a cross-sectional view of the foldable display apparatus 100 according to an embodiment of the present invention. The foldable display apparatus 100 shown in FIGS. 1 and 2 is only an example, and a foldable display apparatus according to an embodiment of the present invention may be variously modified. In addition, the foldable display apparatus 100 shown in FIG. 3 is only an example, and a substantial configuration and structure of a foldable display apparatus according to an embodiment of the present invention may be variously modified. In addition, although examples of connecting two display panels are shown in FIGS. 1 to 3, one screen may be implemented by connecting three or more display panels.

Referring to FIGS. 1 and 2, the foldable display apparatus 100 according to the illustrated embodiment of the present invention includes a body part 180 having a first part 181, a second part 182, and a hinge part 183 which connects the first part 181 and the second part 182. The center line of the hinge part 183 is a hinge axis, e.g., a folding axis H about which the foldable display apparatus 100 is folded. An optical film 195 may be further attached onto a display surface, which increases performance according to use of the foldable display apparatus 100. In embodiments, for example, a polarizing film, an anti-reflective ("AR") film, or an anti-glare ("AG") film may be attached onto or overlap an entire of the display surface. The display panel 200 shown in FIG. 3 is inside the body part 180. The optical film 195 may be attached onto a display surface of the display panel 200. In the cross-sectional view of FIG. 3, the optical film 195 and the first and second parts 181 and 182 of the body part 180 are omitted for convenience and only the display panel 200 is shown.

Referring to FIGS. 1 to 3, the foldable display apparatus 100 includes the display panel 200 that is bendable or foldable with respect to the folding axis H. The display panel 200 includes a plurality of display devices, e.g., first and second display devices 210 and 220, and further includes a soft material part 203 including soft materials in a folding part, and protective windows 201 and 205 in a remaining part excluding the folding part, to protect display parts of the first and second display devices 210 and 220. Although an example of implementing one screen when the foldable display apparatus 100, including two display devices in the display panel 200, is unfolded is shown in FIG. 3, the present embodiment is not limited thereto, and three or more display devices may be connected and used for implementing one screen.

The protective windows 201 and 205 are located on and overlap the first and second display devices 210 and 220, respectively. The protective windows 201 and 205 may include hard materials. In addition, the protective windows 201 and 205 may include transparent materials. In one embodiment, for example, the protective windows 201 and 205 may include a transparent plastic, such as acrylics or polycarbonate, as a transparent plate.

The soft material part 203 may include transparent materials. The soft material part 203 may include flexible and elastic high molecular materials. In one embodiment, for example, the soft material part 203 may include any one of polymethylmethacrylate ("PMMA"), polydimethylsiloxane (:PDMS"), transparent silicon resin, and Teflon®.

Besides within the folding part of the foldable display apparatus 100, the soft material part 203 may also be between one of the display devices, e.g., the second display device 220 among the first and second display devices 210 and 220, and the protective window 205 overlapping the second display device 220. The portion of the soft material part 203 between the protective windows 201 and 205, and the portion between the second display device 220 and the protective window 205 may collectively form a single, unitary, indivisible member. Upper surfaces of the protective window 201, the protective window 205 and the soft material part 203 are coplanar with each other. With the above-described soft material part 203, a separate member may not be further included to level the heights of the two protective windows 201 and 205. Instead of the soft material part 203 between the second display device 220 and the protective window 205, a separate member may be further between the second display device 220, and the protective window 205 overlapping the second display device 220, to level the heights of the two protective windows 201 and 205.

The display panel 200 includes a plurality of display devices, e.g., the first and second display devices 210 and 220. Each of the first and second display devices 210 and 220 may be a flat panel display panel, such as a liquid crystal display ("LCD"), a field emission display ("FED"), a plasma display panel ("PDP"), or an organic light-emitting diode ("OLED") display.

The first and second display devices 210 and 220 are on respective substrates 215 and 225, e.g., glass substrates. A height difference is defined between the first and second display devices 210 and 220 so that an image is continuous at a joint of the first and second display devices 210 and 220 when the foldable display apparatus 100 is unfolded, so as to be shown as a single screen. In one embodiment, for example, as shown in FIG. 3, a height difference may be between the first and second display devices 210 and 220 so that an image is continuous at the joint of the first and second display devices 210 and 220, by including a recess in a portion of a lower part of the substrate 215 below the first display device 210, where the substrate 225 is below the second display device 220 and within the recess of the substrate 215. The first and second display devices 210 and 220 may define the height difference therebetween and partially overlap each other. In one embodiment, for example, the first and second display devices 210 and 220 may be disposed so that several pixels overlap each other.

Figure 4:
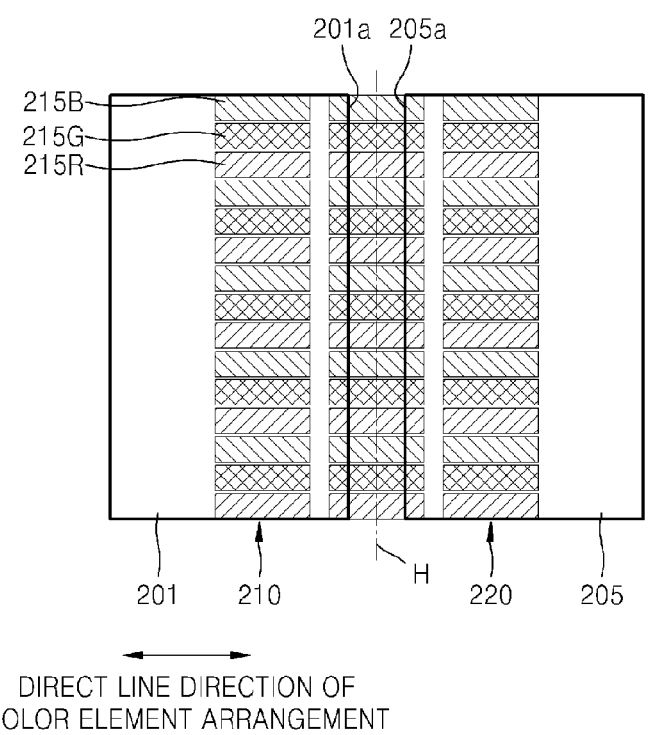
FIG. 4 is a schematic diagram showing an arrangement relationship between a pixel arrangement and protective windows when the foldable display apparatus of FIGS. 1 to 3 is unfolded, in which a plurality of color elements are arranged in a stripe structure, according to an embodiment of the present invention.
Figure 5:
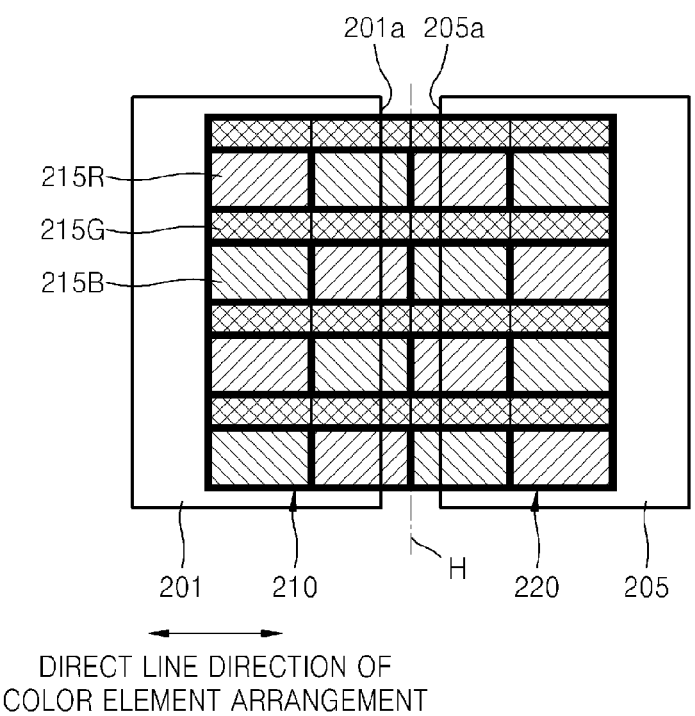
FIG. 5 is a schematic diagram showing an arrangement relationship between a pixel arrangement and protective windows when the foldable display apparatus of FIGS. 1 to 3 is unfolded, in which a plurality of color elements are arranged in a Pentile structure, according to an embodiment of the present invention.

As described above, if there is a height difference between the first and second display devices 210 and 220 so that an image is continuous at the joint, when the foldable display apparatus 100 is unfolded, the first and second display devices 210 and 220 are shown as a single screen, as illustrated in FIGS. 4 and 5.

FIGS. 4 and 5 schematically show a relationship between a pixel arrangement and the protective windows 201 and 205 when the foldable display apparatus 100 is in an unfolded state. FIG. 4 shows an example in which a plurality of color elements are arranged in a stripe structure, and FIG. 5 shows an example in which a plurality of color elements are arranged in a Pentile structure. Here, the color elements correspond to sub-pixels. In an embodiment, the color elements which correspond to sub-pixels may form a pixel.

Referring to FIGS. 4 and 5, the first and second display devices 210 and 220 have a plurality of color elements (three types of color elements 215R, 215G, and 215B in FIGS. 4 and 5 as an example) per one pixel. The first and second display devices 210 and 220 may include groups of a plurality of color elements 215 of a same color At least one plurality of same color elements 215R, 215G, and 215B is arranged in linearly a direct line, and a direct line direction of the group of same color elements is non-parallel, e.g., substantially perpendicular, to the folding axis H. In FIGS. 4 and 5, the color elements 215R, 215G, and 215B may substantially correspond to R, G, and B color elements, respectively.

In one embodiment, for example, the color elements of the first and second display devices 210 and 220 may be in a stripe arrangement structure, as shown in FIG. 4, in which groups of a plurality of same color elements 215R, 215G, and 215B are arranged in a direct line, respectively. FIG. 4 shows an example in which the first and second display devices 210 and 220 have a stripe arrangement structure in which all of the same color R, G, and B color elements as the plurality of color elements 215R, 215G, and 215B in a group are arranged in a direct line. As shown in FIG. 4, when the plurality of color elements 215R, 215G, and 215B are arranged in a stripe structure, a pixel includes three, e.g., R, G, and B, sub-pixels, each of which is a rectangular shape in a plan view. These R, G, and B sub-pixels correspond to R, G, and B color elements, respectively. Here, the direct line direction of the color element arrangement is parallel to a long axis direction of the R, G, and B sub-pixels, e.g., the R, G, and B color elements 215R, 215G, and 215B.

As another embodiment, the color elements of the first and second display devices 210 and 220 may be arranged in a Pentile structure in which at least two of the plurality of color elements 215R, 215G, and 215B are arranged in a lattice and the other one is arranged in a direct line. FIG. 5 shows an example in which the first and second display devices 210 and 220 have R, G, and B color elements as the plurality of color elements 215R, 215G, and 215B and have a structure in which, for example, the R and B color elements, e.g., the color elements 215R and 215B, are arranged in a lattice, and the plurality of G color elements, e.g., the color elements 215G, is arranged in a direct line in the center of the lattice. As shown in FIG. 5, when the G color element is arranged in the center of the lattice while the plurality of color elements 215R, 215G, and 215B are arranged in a Pentile structure, the G color element 215G may rectangular in shape, and since G color elements 215G are rectangular in shape and are arranged in a direct line, the direct line direction of the color element arrangement is a longitudinal axis direction of the G color element 215G.

The arrangement of the color elements 215R, 215G, and 215B of the first and second display devices 210 and 220 may include groups of color elements. Referring again to FIG. 5, a first group includes a plurality of the G color elements 215G in a linear arrangement parallel to the longitudinal axis of the G color element 215G. A second group includes the remaining R and B color elements 215R and 215B alternating in a direction parallel to the longitudinal axis of the G color element 215B. The first group and the second group alternate in a direction parallel to the folding axis H, or perpendicular to the longitudinal axis of the G color element 215B.

Referring again to FIG. 5, instead of the G color element 215G, the R or B color elements 215R or 215B may be arranged in direct line groups, which alternate with groups of the other two color elements which are arranged in a lattice. In addition, although a case where the plurality of color elements 215R, 215G, and 215B in a pixel of the first and second display devices 210 and 220 are R, G, and B color elements is illustrated in FIGS. 4 and 5, the embodiments are not limited thereto and may be variously modified.

In the foldable display apparatus 100 according to an embodiment of the present invention, as illustratively shown in FIGS. 4 and 5, the first and second display devices 210 and 220 have the plurality of color elements 215R, 215G, and 215B per pixel, and at least one of the plurality of color elements 215R, 215G, and 215B is arranged in direct line groups extending across the first and second display devices 210 and 220. The direct line direction of the color element arrangement is non-parallel to the folding axis H.

As such, when the first and second display devices 210 and 220 include the direct line direction of the color element arrangement which is non-parallel to the folding axis H, and when sides 201a and 205a of the protective windows 201 and 205 which contact with the soft material part 203, are parallel to the folding axis H, the sides 201a and 205a of the protective windows 201 and 205 which contact with the soft material part 203, may be non-parallel to the direct line direction of the color element arrangement of the first and second display devices 210 and 220.

In one embodiment, for example, the first and second display devices 210 and 220 may include the direct line direction of the color element arrangement which crosses the folding axis H. In this case, if the sides 201a and 205a of the protective windows 201 and 205 which contact with the soft material part 203, are parallel to the folding axis H, the sides 201a and 205a of the protective windows 201 and 205 which contact with the soft material part 203, cross the direct line direction of the color element arrangement of the first and second display devices 210 and 220.

That is, a relative arrangement of the first and second display devices 210 and 220 and the protective windows 201 and 205 may be determined so that borderlines of the protective windows 201 and 205 are substantially perpendicular to a longer axis direction of sub-pixels when pixels have a stripe arrangement or are substantially perpendicular to a longer axis direction of a color element, for example, a G color element 215G arranged in a direct line when each pixel has a Pentile structure, e.g., each pixel has directivity.

FIGS. 4 and 5 illustratively show a case where the sides 201a and 205a of the protective windows 201 and 205 which contact with the soft material part 203, cross the direct line direction of the color element arrangement of the first and second display devices 210 and 220 and are parallel to the folding axis H.

As described above, if the sides 201a and 205a of the protective windows 201 and 205, which contact with the soft material part 203, are non-parallel, e.g., cross, to the direct line direction of the color element arrangement of the first and second display devices 210 and 220, an influence of, for example, R, G, and B, is almost the same in the borderlines of the protective windows 201 and 205, e.g., the sides 201a and 205a contacting with the soft material part 203. Since the influence of R, G and B is substantially the same at the sides 201a and 205a of the protective windows 201 and 205, a problem of showing lines in the borderlines of the protective windows 201 and 205 is reduced or effectively prevented. That is, a sense of rupture or disconnection on a single display screen by reflection of light can be significantly improved at a joint part where hard materials and soft materials meet each other, when a window structure in which a folding part of the window includes the soft materials and a remaining part of the window includes the hard materials, is used.

Figure 6:
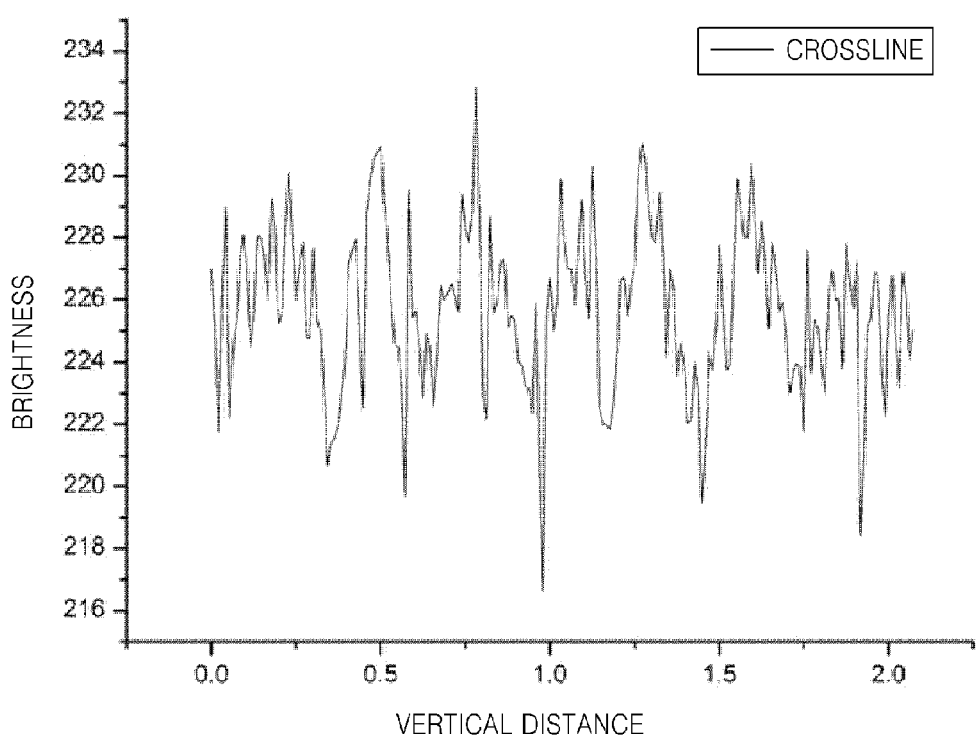
FIG. 6 is a graph schematically showing a brightness distribution on a line which crosses borderlines between protective windows and a soft material part, when pixels are arranged so that a direct line direction of a color element arrangement crosses the borderlines between the protective windows and the soft material part, in a foldable display apparatus according to an embodiment of the present invention.
Figure 7:
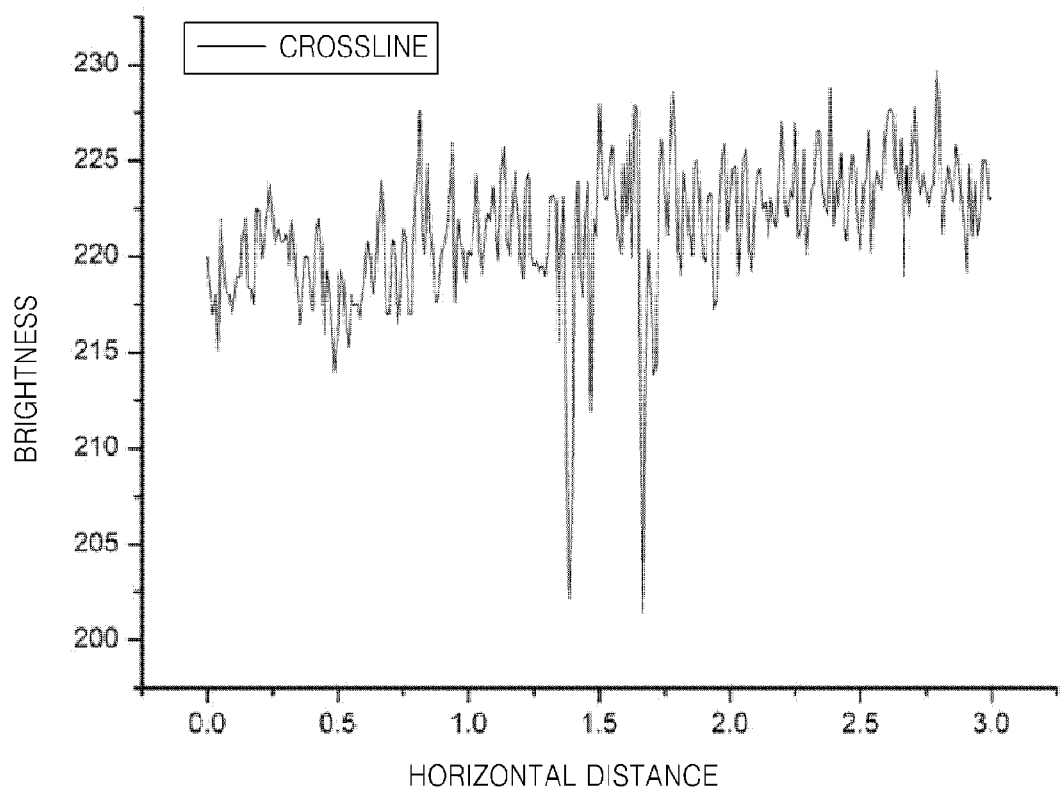
FIG. 7 is a graph, which is an example for comparison, schematically showing a brightness distribution on a line crossing borderlines between protective windows and a soft material part, when pixels are arranged so that a direct line direction of the color element arrangement is parallel to the borderlines between the protective windows and the soft material part, in a general foldable display apparatus.

FIG. 6 is a graph schematically showing a brightness distribution on a line which crosses borderlines between protective windows and a soft material part, when pixels are arranged so that a direct line direction of the color element arrangement crosses the borderlines between the protective windows and the soft material part, in a foldable display apparatus according to an embodiment of the present invention. FIG. 7 is a graph, as a comparison example, schematically showing a brightness distribution on a line which crosses borderlines between protective windows and a soft material part, when pixels are arranged so that a direct line direction of the color element arrangement is parallel to the borderlines between the protective windows and the soft material part, in a general foldable display apparatus.

Comparing FIG. 6 with FIG. 7, when the direct line direction of the color element arrangement is parallel to the borderlines of the protective windows, brightness decreases about 10% in borderline positions of the protective windows. On the contrary, when pixels are arranged to cross the direct line direction of the color element arrangement and the borderlines of the protective windows, as in a foldable display apparatus according to an embodiment of the present invention, the borderlines of the protective windows are not shown well and brightness does not decrease significantly.

As described above according to the one or more of the above embodiments of the present invention, since a foldable display apparatus has a plurality of display devices each having a pixel arrangement in which at least one of a plurality of color elements per pixel is arranged in a direct line and a direct line direction of the color element arrangement is non-parallel to a folding axis of the foldable display apparatus, a sense of rupture or disconnect on a single display screen by reflection of light can be significantly improved at a joint part where hard materials and soft materials meet each other, when a window structure in which a folding part includes the soft materials and a non-folding part includes the hard materials is used.

It should be understood that the embodiments described herein should be considered in a descriptive sense only and not for purposes of limitation. Descriptions of features or aspects within each embodiment should typically be considered as available for other similar features or aspects in other embodiments.

What is claimed is:
1. A foldable display apparatus comprising:
 a bendable display panel which folds with respect to a folding axis, the display panel comprising:
  a plurality of display devices each comprising:
   a display part, and
   a plurality of pixels each including a plurality of color elements having different colors from each other,
   wherein
   a plurality of color elements of a same color is linearly arranged in a direct line direction which is non-parallel to the folding axis, and respective same color elements of the plurality of display devices overlap each other at the folding axis in an unfolded state the foldable display apparatus; and
a window layer comprising:
a soft material part comprising a soft material in a folding part of the display panel, and
a protective window part other than the soft material part, wherein the protective window protects the display part of the plurality of display devices.

2. The foldable display apparatus of claim 1, wherein the plurality of display devices includes color elements in a stripe arrangement structure in which the color elements of each color are in consecutive arrangement in the direct line direction, respectively.

3. The foldable display apparatus of claim 1, wherein the plurality of display devices includes:
the color elements of one color in consecutive arrangement in the direct line direction, and
color elements of remaining colors alternating in the direct line direction.

4. The foldable display apparatus of claim 1, wherein the protective window part comprises a hard material.

5. The foldable display apparatus of claim 1, wherein the soft material part and the protective window part comprise a transparent material.

6. The foldable display apparatus of claim 1, wherein the plurality of display devices comprises a first display device and a second display device arranged with a height difference so that an image is continuous at a joint between the first display device and the second display device when the foldable display apparatus is in the unfolded state.

7. The foldable display apparatus of claim 6, wherein the soft material part is further between a display device among the first and second display devices which is furthest from the window layer, and a portion of the protective window part on the display device.

8. The foldable display apparatus of claim 6, wherein each of the plurality of display devices has a structure in which the direct line direction crosses the folding axis.

9. The foldable display apparatus of claim 1, wherein each of the plurality of display devices has a structure in which the direct line direction crosses the folding axis.

10. The foldable display apparatus of claim 1, wherein the plurality of display devices includes:
a first group of color elements of a same color in consecutive arrangement in the direct line direction and extending across the display devices; and
a second group of color elements of different colors in alternating arrangement in the direct line direction and extending across the display devices,
wherein the first group of color elements and the second group of color elements alternate in a direction parallel to the folding axis of the display panel.

11. The foldable display apparatus of claim 1, wherein
the protective window part includes a first window part which overlaps the display part of a first display device, and a second window part which overlaps the display part of a second display device, and
the first and second window parts are separated from each other in a plan view of the foldable display apparatus in the unfolded state, and the soft material part is between the separated first and second window parts.

12. The foldable display apparatus of claim 11, wherein
a first boundary between the first window part and the soft material part, and a second boundary between the second window part and the soft material part, each extend in a boundary direction, and
the boundary direction of the first and second boundaries is non-parallel to the direct line direction in which the color elements arranged.

13. The foldable display apparatus of claim 12, wherein the boundary direction of the first and second boundaries is parallel to the folding axis.

14. A method of forming a bendable display device, the method comprising:
forming a display panel which folds along a folding axis, the display panel including a plurality of display devices and a window layer,
wherein the forming a display panel includes:
forming the plurality of display devices each including a display part, and a plurality of pixels each including a plurality of color elements having different colors from each other,
wherein
a plurality of color elements of a same color is linearly arranged in a direct line direction which is non-parallel to the folding axis, and
respective same color elements of the plurality of display devices overlap each other at the folding axis in an unfolded state the foldable display apparatus; and
disposing the window layer on the display panel, the window layer including:
a soft material part comprising a soft material in a folding part of the display panel, and
a protective window part other than the soft material part, wherein the protective window protects the display part of the plurality of display devices.

* * * * *